US012739067B2

(12) United States Patent
Lyu et al.

(10) Patent No.: US 12,739,067 B2
(45) Date of Patent: Sep. 15, 2026

(54) METHOD AND APPARATUS FOR WIRELESS COMMUNICATION

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

(*) Notice: Subject to any disclaimer, the term of this patent is extended or adjusted under 35 U.S.C. 154(b) by 0 days.

(21) Appl. No.: 19/266,534

(22) Filed: Jul. 11, 2025

(65) Prior Publication Data

US 2025/0343638 A1 Nov. 6, 2025

Related U.S. Application Data

(63) Continuation of application No. PCT/CN2023/105520, filed on Jul. 3, 2023.

(30) Foreign Application Priority Data

Nov. 17, 2022 (CN) ........................ 202211440877.3

(51) Int. Cl.
*H04L 1/1867* (2023.01)
*H04L 5/00* (2006.01)

(52) U.S. Cl.
CPC .......... *H04L 1/1896* (2013.01); *H04L 5/0055* (2013.01)

(58) Field of Classification Search
CPC ............................ H04L 1/1896; H04L 5/0055
(Continued)

(56) References Cited

U.S. PATENT DOCUMENTS

2020/0228251 A1* 7/2020 Yeo ........................ H04L 5/0082
2021/0314100 A1* 10/2021 Yeo ................... H04W 72/0453
(Continued)

FOREIGN PATENT DOCUMENTS

CN 111133817 A 5/2020
CN 112398597 A 2/2021
(Continued)

OTHER PUBLICATIONS

Huawei et al., "Discussion on HARQ feedback enable and disable," 3GPP TSG-RAN WG2 #107, R2-1911071, Prague, Czech Republic, Aug. 26-30, 2019, 4 pages.
(Continued)

*Primary Examiner* — Mang Hang Yeung
(74) *Attorney, Agent, or Firm* — Fish & Richardson P.C.

(57) ABSTRACT

The present disclosure provides a method and apparatus for wireless communication. One example method includes: receiving, by a first device, a plurality of transport blocks, where the plurality of transport blocks include transport blocks disabling HARQ feedback and/or transport blocks not disabling HARQ feedback; and determining, by the first device, to enable or disable a first HARQ process corresponding to the plurality of transport blocks based on first information, where the first information is determined based on one or both of: the transport blocks disabling HARQ feedback in the plurality of transport blocks; and the transport blocks not disabling HARQ feedback in the plurality of transport blocks.

20 Claims, 4 Drawing Sheets a first device receives a plurality of transport blocks — S510 the first device determines to enable or disable a first HARQ process corresponding to the plurality of transport blocks based on first information — S520

(58) Field of Classification Search
USPC .......................................................... 370/329
See application file for complete search history.

(56) References Cited

U.S. PATENT DOCUMENTS

| | | | | |
|---|---|---|---|---|
| 2022/0109529 | A1 | 4/2022 | Ye et al. | |
| 2022/0393803 | A1* | 12/2022 | Chen | H04L 1/1812 |
| 2024/0032099 | A1* | 1/2024 | Hoang | H04W 72/02 |

FOREIGN PATENT DOCUMENTS

| | | | |
|---|---|---|---|
| CN | 112753192 | A | 5/2021 |
| CN | 113271180 | A | 8/2021 |
| CN | 114557020 | A | 5/2022 |
| CN | 114642046 | A | 6/2022 |
| CN | 114747168 | A | 7/2022 |
| CN | 115004596 | A | 9/2022 |
| CN | 115242355 | A | 10/2022 |
| CN | 115580380 | A | 1/2023 |
| WO | WO 2022155600 | A2 | 7/2022 |
| WO | WO 2022203581 | A1 | 9/2022 |

OTHER PUBLICATIONS

International Search Report and Written Opinion in International Appln. No. PCT/CN2023/105520, mailed on Aug. 23, 2023, 14 pages (with English translation).

Nokia, “Multi-bit feedback for NR HARQ operation,” 3GPP TSG-RAN WG1 Meeting #88, R1-1703325, Athens, Greece, Feb. 13-17, 2017, 5 pages.

Notice of Allowance in Chinese Appln. No. 202211440877.3, mailed on Feb. 17, 2023, 6 pages (with English translation).

Office Action in Chinese Appln. No. 202211440877.3, mailed on Jan. 19, 2023, 14 pages (with English translation).

* cited by examiner

METHOD AND APPARATUS FOR WIRELESS COMMUNICATION

CROSS-REFERENCE TO RELATED APPLICATIONS

This application is a continuation of International Application No. PCT/CN2023/105520, filed on Jul. 3, 2023, which claims priority to Chinese Patent Application No. 202211440877.3, filed on Nov. 17, 2022. The disclosures of the aforementioned applications are hereby incorporated by reference in their entireties.

TECHNICAL FIELD

The present disclosure relates to the field of communication technology, and more specifically to a method and apparatus for wireless communication.

BACKGROUND

Certain communication systems (such as non-terrestrial network (NTN) systems) have significant transmission delays. In such communication systems, enabling a hybrid automatic repeat reQuest (HARQ) process when a device sends a transport block may incur substantial overhead. To reduce the overhead, the device may introduce a feedback-free HARQ process by disabling HARQ feedback.

For multi-transport blocks scheduling, when some transport blocks among a plurality of transport blocks disable HARQ feedback, how to provide unified HARQ feedback based on the plurality of transport blocks is an urgent issue to be addressed.

SUMMARY

The present disclosure provides a method and apparatus for wireless communication to solve the problem of how to provide unified feedback for the multiple transport blocks when the multiple transport blocks include transport blocks disabling HARQ feedback.

According to a first aspect, a method for wireless communication is provided, including: receiving, by a first device, a plurality of transport blocks, where the plurality of transport blocks include transport blocks disabling hybrid automatic repeat request (HARQ) feedback and/or transport blocks not disabling HARQ feedback; and determining, by the first device, to enable or disable a first HARQ process corresponding to the plurality of transport blocks based on first information, where the first information is determined based on one or both of: the transport blocks disabling HARQ feedback in the plurality of transport blocks; and the transport blocks not disabling HARQ feedback in the plurality of transport blocks.

According to a second aspect, a method for wireless communication is provided, including: receiving, by a first device, a first channel, where the first channel is used to send a first trigger condition, and the first trigger condition is used to indicate a trigger condition corresponding to a media access control control element (MAC CE) after the first device receives a second channel; and receiving, by the first device, the second channel, where the second channel is used to carry transport blocks disabling HARQ feedback that are indicated by the first channel; where the first trigger condition is determined based on one or both of: a first HARQ process, where the first HARQ process is used for the first device to send indication information, and the indication information corresponds to the transport blocks disabling HARQ feedback; and a first time unit based on a time domain position of the second channel.

According to a third aspect, an apparatus for wireless communication is provided, where the apparatus is a first device and the first device includes: a receiving unit, configured to receive a plurality of transport blocks, where the plurality of transport blocks include transport blocks disabling HARQ feedback and/or transport blocks not disabling HARQ feedback; a determining unit, configured to determine to enable or disable a first HARQ process corresponding to the plurality of transport blocks based on the first information, where the first information is determined based on one or both of: the transport blocks disabling HARQ feedback in the plurality of transport blocks; and the transport blocks not disabling HARQ feedback in the plurality of transport blocks.

According to a fourth aspect, an apparatus for wireless communication is provided, where the apparatus is a first device and the first device includes: a first receiving unit, configured to receive a first channel, where the first channel is used to send a first trigger condition, and the first trigger condition is used to indicate a trigger condition corresponding to a MAC CE after the first device receives a second channel; and a second receiving unit, configured to receive the second channel, where the second channel is used to carry transport blocks disabling HARQ feedback that are indicated by the first channel; where the first trigger condition is determined based on one or both of: a first HARQ process, where the first HARQ process is used for the first device to send indication information, and the indication information corresponds to the transport blocks disabling HARQ feedback; and a first time unit based on a time domain position of the second channel.

According to a fifth aspect, an apparatus for communication is provided, including a memory and a processor, where the memory is configured to store a program, and the processor is configured to invoke the program in the memory to perform the method according to the first aspect or the second aspect.

According to a sixth aspect, an apparatus is provided, including a processor, configured to invoke a program from a memory to perform the method according to the first aspect or the second aspect.

According to a seventh aspect, a chip is provided, including a processor, configured to invoke a program from a memory to cause a device installed with the chip to perform the method according to the first aspect or the second aspect.

According to an eighth aspect, a computer-readable storage medium is provided, where the computer-readable storage medium stores a program, and the program causes a computer to perform the method according to the first aspect or the second aspect.

According to a ninth aspect, a computer program product is provided, including a program, where the program causes a computer to perform the method according to the first aspect or the second aspect.

According to a tenth aspect, a computer program is provided, where the computer program causes a computer to perform the method according to the first aspect or the second aspect.

In the embodiments of the present disclosure, when the plurality of transport blocks received by the first device include transport blocks disabling HARQ feedback, the HARQ process corresponding to the plurality of transport blocks may be determined to be enabled or disabled based on the first information, where the first information is related to the transport blocks that disable and/or do not disable HARQ feedback. Based on the enabling or disabling of the HARQ process, the first device may provide unified HARQ feedback for the plurality of transport blocks that introduce HARQ disabling.

DETAILED DESCRIPTION OF THE EMBODIMENTS

Figure 1:
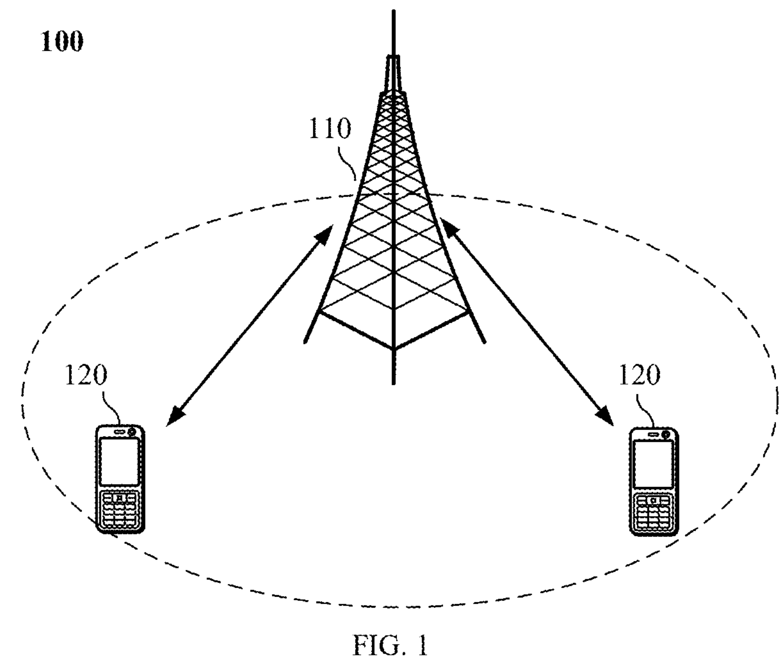
FIG. 1 is a wireless communication system applied in accordance with an embodiment of the present disclosure.

The technical solutions in the embodiments of the present disclosure are described below with reference to the accompanying drawings in the embodiments of the present disclosure. It is apparent that the described embodiments are just a part but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure may be applied to various communication systems. For example, the embodiments of the present disclosure may be applied to a global system of mobile communication (GSM) system, a code division multiple access (CDMA) system, a wideband code division multiple access (WCDMA) system, a general packet radio service (GPRS) system, a long term evolution (LTE) system, an advanced long term evolution (LTE-A) system, a new radio (NR) system, an evolution system of the NR system, an LTE-based access to unlicensed spectrum (NTN-U) system, an NR-based access to unlicensed spectrum (NR-U) system, a non-terrestrial network (NTN) system, a universal mobile telecommunication system (UMTS), a wireless local area networks (WLAN), a wireless fidelity (WiFi), or a 5th-generation (5G) system. The embodiments of the present disclosure may be further applied to other communication systems, e.g., a future communication system. The future communication system may be, for example, a 6th generation (6G) mobile communication system, or a satellite communication system, etc.

Conventional communication systems support a limited number of connections and are easy to implement. However, with the development of communication technologies, the communication system may not only support conventional cellular communication, but also support one or more types of communication of other types. For example, the communication system may support one or more of: device to device (D2D) communication, machine to machine (M2M) communication, machine type communication (MTC), enhanced MTC (eMTC), vehicle to vehicle (V2V) communication, vehicle to everything (V2X) communication, etc. The embodiments of the present disclosure may also be applied to communication systems that support the above communication methods.

The communication system in the embodiments of the present disclosure may be applied to a carrier aggregation (CA) scenario, a dual connectivity (DC) scenario, or a standalone (SA) fabric scenario.

The communication system in the embodiments of the present disclosure may be applied to an unlicensed spectrum. The unlicensed spectrum may also be considered as a shared spectrum. Alternatively, the communication system in the embodiments of the present disclosure may also be applied to a licensed spectrum. The licensed spectrum may also be considered as a dedicated spectrum.

The embodiments of the present disclosure may be applied to a terrestrial network (TN) system or may be applied to the NTN system. As an example, the NTN system includes a 4G-based NTN system, an internet of things (IoT)-based NTN system, and a narrow band IoT (NB-IoT)-based NTN system.

The communication system may include one or more terminal devices. The terminal device mentioned in the embodiments of the present disclosure may also be referred to as user equipment (UE), an access terminal, a subscriber unit, a subscriber station, a mobile station (MS), a mobile terminal (MT), a remote station, a remote terminal, a mobile device, a user terminal, a terminal, a wireless communication device, a user agent, a user apparatus, or the like.

In some embodiments, the terminal device may be a STATION (ST) in the WLAN. In some embodiments, the terminal device may also be a cellular phone, a cordless phone, a session initiation protocol (SIP) phone, a wireless local loop (WLL) station, a personal digital assistant (PDA) device, a handheld device having a wireless communication function, a computing device or another possessing device connected to a wireless modem, a vehicle-mounted device, a wearable device, a terminal device in a next-generation communication system (e.g., the NR network), or a terminal device in a future evolved public land mobile network (PLMN) network.

In some embodiments, the terminal device may be a device that provides voice and/or data connectivity to a user. For example, the terminal device may be a handheld device, a vehicle-mounted device, etc., having a wireless connection function. As some specific examples, the terminal device may be a mobile phone, a pad, a notebook computer, a palmtop computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, a wireless terminal in smart home, etc.

In some embodiments, the terminal device may be deployed on land. For example, the terminal device may be deployed indoors or outdoors. In some embodiments, the terminal device may be deployed on a water surface, such as ships, etc. In some embodiments, the terminal device may be deployed in the air, such as aircrafts, balloons, and satellites, etc.

In addition to the terminal device, the communication system may further include one or more network devices. The network device in the embodiments of the present disclosure may be a device configured to communicate with the terminal device, and the network device may also be referred to as an access network device or a radio access network device. For example, the network device may be a base station. The network device in the embodiments of the present disclosure may refer to a radio access network (RAN) node (or device) that accesses the terminal device to a wireless network. The base station may broadly cover various names as follows, or may be replaced with the following names, such as a node B (NodeB), an evolved NodeB (eNB), a next generation NodeB (gNB), a relay station, an access point, a transmitting and receiving point (TRP), a transmitting point (TP), a master station (MeNB), a secondary station (SeNB), a multistandard radio (MSR) node, a femtocell, a network controller, an access node, a wireless node, an access point (AP), a transmission node, a transceiver node, a base band unit (BBU), a remote radio unit (RRU), an active antenna unit (AAU), a remote radio unit (RRH), a central unit (CU), a distributed unit (DU), a positioning node, and the like. The base station may be a macro base station, a micro base station, a relay node, a donor node or the like, or a combination thereof. The base station may further refer to a communication module, a modem, or a chip disposed in the foregoing device or apparatus. The base station may also be a mobile switching center and a device that undertakes a function of the base station in D2D, V2X, M2M communication, a network side device in the 6G network, a device that undertakes a function of the base station in a future communication system, etc. The base station may support networks of the same or different access technologies. A specific technology adopted by the network device and a specific form of the device are not limited in the embodiments of the present disclosure.

The base station may be fixed or mobile. For example, a helicopter or drone may be configured to serve as a mobile base station, and one or more cells move according to the location of the mobile base station. In other examples, a helicopter or drone may be configured to serve as a device in communication with another base station.

In some deployments, the network device in the embodiments of the present disclosure may be a CU or a DU, or the network device includes a CU and a DU. The gNB may also include AAU.

As an example rather than a limitation, the network device in the embodiments of the present disclosure may have a mobility characteristic, for example, the network device may be a mobile device. In some embodiments of the present disclosure, the network device may be a satellite or a balloon station. In some embodiments of the present disclosure, the network device may be a base station disposed at a location such as land, water, etc.

In the embodiments of the present disclosure, the network device may provide services for a cell, and the terminal device communicates with the network device via a transmission resource (e.g., a frequency domain resource, or a spectrum resource) used by the cell. The cell may be a cell corresponding to the network device (e.g., a base station), and the cell may belong to a macro base station or a base station corresponding to a small cell. The small cell may include a metro cell, a micro cell, a pico cell, a femto cell, etc., and these small cells have the characteristics of a small coverage and a low transmission power, which are suitable for providing a high-rate data transmission service.

For example, FIG. 1 is a schematic architectural diagram of a communication system according to an embodiment of the present disclosure. As shown in FIG. 1, the communication system 100 may include a network device 110, and the network device 110 may be a device that communicates with a terminal device 120 (or referred to as a communication terminal or a terminal). The network device 110 may provide communication coverage for a particular geographic area and may communicate with a terminal device located within the coverage area.

FIG. 1 exemplarily shows a network device and two terminal devices. In some embodiments of the present disclosure, the communication system 100 may include a plurality of network devices, and the coverage of each network device may include other numbers of terminal devices, which is not limited in the embodiments of the present disclosure.

Figure 2:
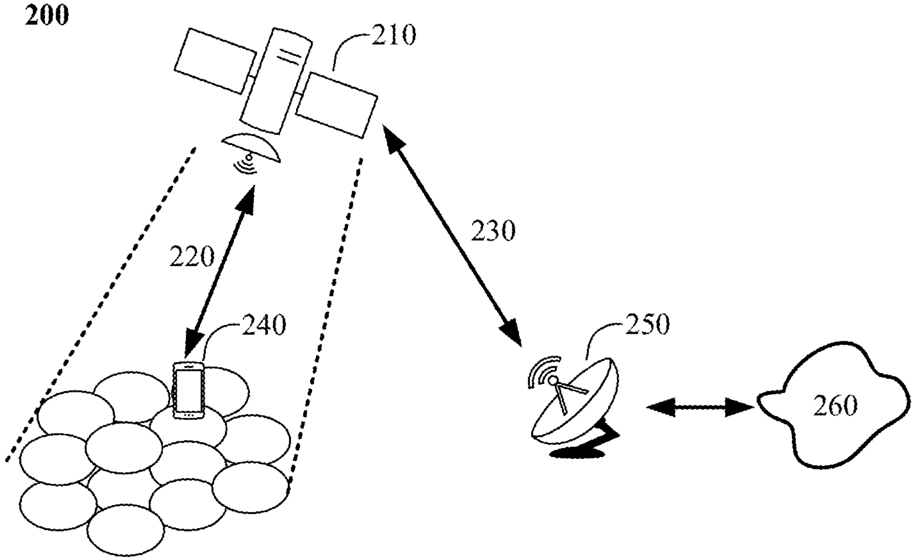
FIG. 2 is an NTN system applied in accordance with an embodiment of the present disclosure.

Exemplarily, FIG. 2 is a schematic diagram of an architecture of the NTN system mentioned above. As shown in FIG. 2, a satellite radio access network 200 includes a satellite 210, a service link 220, a feeder link 230, a terminal device 240, a gateway 250, and a network 260 that includes a base station and a core network.

The satellite 210 is a spacecraft based on a space platform. The service link 220 refers to a link between the satellite 210 and the terminal device 240. The feeder link 230 refers to a link between the gateway 250 and the satellite 210. The gateway 250 based on Earth connects the satellite 210 to the base station or core network, specifically depending on a choice of the architecture.

The NTN architecture shown in FIG. 2 is a bent-pipe transponder architecture. In this architecture, the base station is located on Earth behind the gateway 250, and the satellite 210 acts as a relay. The satellite 210 operates as a repeater for forwarding signals from the feeder link 230 to the service link 220 or forwarding signals from the service link 220 to the feeder link 230. That is to say, the satellite 210 does not have the functionality of the base station, and communication between the terminal device 240 and the base station in the network 260 needs to be relayed through the satellite 210.

Figure 3:
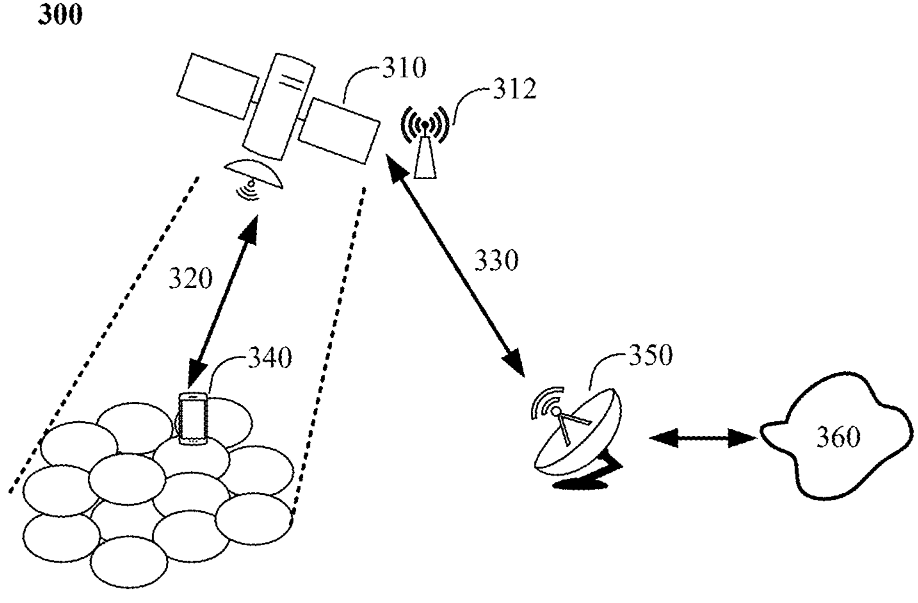
FIG. 3 is another NTN system applied in accordance with an embodiment of the present disclosure.

Exemplarily, FIG. 3 is a schematic diagram of another architecture of the NTN system. Compared to FIG. 2, a satellite 310 has a base station 312, and a network 360 behind a gateway 350 includes only the core network.

The NTN architecture shown in FIG. 3 is a regenerative transponder architecture. In this architecture, the satellite 310 carries the base station 312, which may be directly connected to the core network based on Earth via a link. The satellite 310 has the functionality of the base station, allowing the terminal device 340 to communicate directly with the satellite 310. Therefore, the satellite 310 may be referred to as a network device.

The communication systems in the architectures shown in FIG. 2 and FIG. 3 may include a plurality of network devices, and a coverage area of each network device may include other numbers of terminal devices, which is not limited in the embodiments of the present disclosure.

In the embodiments of the present disclosure, the wireless communication system shown in FIG. 1 to FIG. 3 may further include other network entities such as a mobility management entity (MME), an access and mobility management function (AMF), etc., which is not limited in the embodiments of the present disclosure.

It should be understood that a device with a communication function in the network/system in the embodiments of the present disclosure may be referred to as the communication device. Taking the communication system 100 shown in FIG. 1A as an example, the communication device may include the network device 110 and the terminal device 120 that have communication functions. The network device 110 and terminal device 120 may be specific devices as described above, which are not elaborated further here. The communication device may further include other devices in the communication system 100, such as a network controller, a mobility management entity, and other network entities, which is not limited in the embodiments of the present disclosure.

To facilitate understanding, some relevant technical knowledge involved in the embodiments of the present disclosure is introduced first. The following related technologies may be combined in any manner with the technical solutions of the present disclosure and are all within the protection scope of the embodiments of the present disclosure. The embodiments of the present disclosure include at least a portion of the following content.

NTN

With the development of communication technology, communication systems (e.g., 5G) will integrate the market potential of satellite and terrestrial network infrastructure. For example, the 5G standard recognizes NTN, which includes satellite segments, as part of the 3$^{rd}$ generation partnership project (3GPP) 5G connectivity infrastructure.

Communication satellites are categorized based on their orbital altitudes into low Earth orbit (LEO) satellites, medium Earth orbit (MEO) satellites, geostationary (stationary) earth orbit (GEO) satellites, and highly elliptical orbit (HEO) satellites. Among these, LEO is defined as an orbit centered around the Earth with an altitude of 2000 kilometers or less, or with at least 11.25 cycles per day, and an eccentricity of less than 0.25. Most artificial objects in outer space are located in LEO. LEO satellites operate at high speeds (mobility) around the Earth but follow predictable or determined orbits.

Satellites at different orbital altitudes have different orbital periods:

LEO: typical altitude of 250 to 1500 kilometers, orbital period of 90 to 120 minutes.

MEO: typical altitude of 5000 to 25000 kilometers, orbital period of 3 to 15 hours.

GEO: altitude of approximately 35786 kilometers, orbital period of 24 hours.

NTN refers to networks or network segments that utilize radio frequency (RF) resources from satellite or unmanned aerial system (UAS) platforms. Typical scenarios for NTN accessing the terminal device involve NTN transparent payloads or NTN regenerative payloads. The architectures of the two NTN systems that take satellites as examples are shown in FIG. 2 and FIG. 3 in the previous text. Among them, the bent-pipe transponder architecture shown in FIG. 2 corresponds to the NTN transparent payload, and the regenerative transponder architecture shown in FIG. 3 corresponds to the NTN regenerative payload.

In NTN systems, NTN nodes (such as satellites) are located hundreds of kilometers above the Earth's surface, resulting in longer round trip times (RTT) between terminal devices and satellites. For example, a round trip time from UE to the satellite (UE-sat RTT) is much greater than a round trip time from the terminal device to the network device (such as gNB) in the terrestrial network. Therefore, a round trip delay (RTD) of the terminal device in the NTN system is much higher than RTD in the terrestrial communication network (such as NR).

HARQ

HARQ protocol is one of the most important functions in communication systems (such as NR systems). HARQ, together with link adaptation, enables efficient, reliable, and low-latency data transmission within the system. Link adaptation may be executed through channel state information (CSI) feedback and HARQ acknowledgment (ACK)/HARQ negative acknowledgment (NACK).

According to the HARQ protocol, the terminal device may send or retransmit new data based on feedback from the network device. The HARQ function is used to ensure transmission between the terminal device and the network device at a physical layer. The HARQ process is designed based on the physical (PHY) layer and media access control (MAC) layer, e.g., an MAC entity includes a HARQ entity for each serving cell.

The HARQ process may include data transmission and HARQ feedback. The HARQ protocol allows a plurality of HARQ processes (also referred to as processing) to operate in parallel. According to requirements for certain technical specifications (e.g., 3GPP TS 38.321 MAC specification), each HARQ entity maintains 16 downlink HARQ processes (or processors) or 2 HARQ processes for NB-IoT. Each HARQ process is associated with a HARQ process identity (ID). The same HARQ process ID may be used to identify retransmission of data. Therefore, the communication device can utilize the retransmission for soft combining. To perform soft combining, a coded data block that is incorrectly received is typically stored in a receiver (e.g., soft buffer) rather than being discarded. When receiving a retransmitted block, the communication device combines the two blocks. The soft buffer may be implemented as a buffer or memory for storing soft-combined data.

The HARQ process ID is used to identify a unique HARQ process. The HARQ entity directs HARQ information and associated transport blocks (TB) received on a downlink shared channel (DL-SCH) to a corresponding HARQ process. Generally, a duration corresponding to the number of HARQ processes is greater than a propagation delay. In other words, the number of HARQ processes currently supported by the HARQ protocol may accommodate the propagation delay in the terrestrial network.

Each link transmission may be associated with a HARQ process ID. The operation of HARQ may be illustrated through the following example. First, in a downlink transmission, in response to downlink sending/retransmission on a physical uplink control channel (PUCCH) or physical uplink shared channel (PUSCH), uplink feedback or HARQ feedback is executed. Subsequently, in the uplink transmission, an uplink HARQ retransmission may be triggered without waiting for feedback from the previous transmission.

Within the HARQ bundle, the HARQ retransmission may be triggered based on a PUSCH aggregation factor (pusch AggregationFactor) of dynamical authorization and a repK of a configured uplink authorization, respectively. Therefore, the retransmission may be performed directly without waiting for feedback from the previous transmission. Specifically, the network device may configure the number of transport blocks for a transmission (i.e., the PUSCH aggregation factor) in the terminal device through dynamic scheduling bundle. Alternatively, the network device may configure the number of transmissions of a transport block (repK)

through a set of configured uplink authorizations. For example, when the MAC entity is configured with pusch AggregationFactor>1, the parameter 'pusch Aggregation-Factor' provides the number of transport blocks for the transmission within the dynamic authorization bundle. When the MAC entity is configured with repK>1, the parameter 'repK' provides the number of transmissions of the transport block within the configured uplink authorization bundle.

The current HARQ processes are primarily designed for the terrestrial network. The propagation delay of HARQ round trip time (HARQ-RTT) is typically limited to within 1 millisecond. HARQ-RTT is a time interval between the initial transmission and the retransmission. However, certain communication systems have longer propagation delays, such as NTN systems. In NTN systems, communication via satellites results in longer distances and longer RTTs.

Taking the orbital altitude of GEO as an example, the propagation delay for round-trip transmission is approximately 500 milliseconds due to the greater distance of the communication devices. In other words, if the NR downlink (DL) is used for GEO satellite communication, a propagation delay of 500 milliseconds will result in a long HARQ RTT. Due to the increase in HARQ RTT, an increase in end-to-end latency may not meet the quality of service (QOS) requirements for retransmitted packets.

Furthermore, in 16 HARQ processes supported by NR and a 1 millisecond slot duration, a percentage of the available peak throughput to the total channel capacity is very low. This indicates that the number of HARQ processes currently supported by the HARQ protocol is insufficient to accommodate potential large propagation delays in NTN systems. Therefore, for communication systems where the propagation delay is significantly greater than the duration of the HARQ processes, the current HARQ mechanism may not be feasible.

To meet the longer HARQ RTT, a minimum number of required HARQ processes may be increased. However, increasing the number of HARQ processes leads to higher soft buffer requirements for the communication device, resulting in higher complexity and cost. Therefore, the current HARQ mechanism is not suitable for communication systems with large propagation delays.

MAC CE Activation Timing

As mentioned above, the HARQ mechanism is designed based on the physical layer and MAC layer. The media access control control element (MAC CE) may trigger the channel transmission at the physical layer. HARQ feedback is useful in certain processes. For example, the activation timing of the MAC CE between the network device and the terminal device is based on the time of receiving HARQ feedback. In other words, the MAC CE may be activated according to a normal procedure after receiving a NACK/ACK message. Specifically, after receiving a MAC CE command related to the PDSCH, the terminal device may send the HARQ feedback corresponding to the PDSCH via the uplink (UL) channel. The activation time of the MAC CE is typically 3 ms after receiving the uplink channel.

Figure 4:
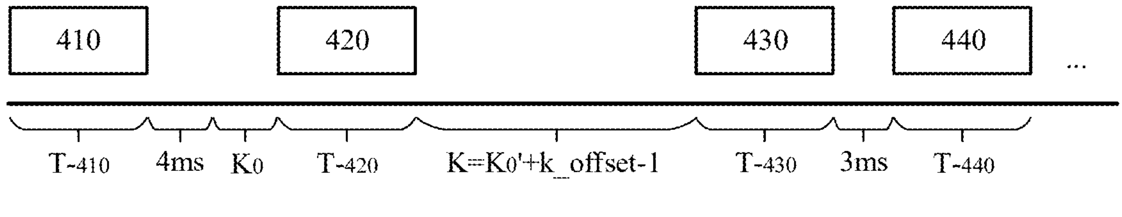
FIG. 4 is a schematic diagram of activating a transmission channel based on a MAC CE when there is HARQ feedback.

For ease of understanding, an example of the interaction between the network device and the terminal device in IoT NTN is provided, along with a description of a process for transmitting the channel based on MAC CE activation timing with reference to FIG. 4. As shown in FIG. 4, along the timeline, the network device sequentially sends a narrowband physical downlink control channel (NPDCCH) 410 and a narrowband physical downlink shared channel (NPDSCH) 420 to the terminal device. Three milliseconds after the terminal device sends a narrowband physical uplink shared channel (NPUSCH) 430, the network device continues to send a NPDCCH 440. The required time-domain resources for sending NPDCCH 410, NPDSCH 420, NPUSCH 430, and NPDCCH 440 are $T_{-410}$ to $T_{-440}$, respectively.

As shown in FIG. 4, after the network device sends NPDCCH 410, it waits for a time interval of 4 ms+$K_0$ before sending NPDSCH 420. The value of $K_0$ may be indicated by a scheduling delay field (I_delay) in downlink control information (DCI) indication.

After sending NPDSCH 420, the network device receives HARQ feedback from the terminal device, such as ACK or NACK, after K subframes. Here, $K=K_0'+K\_offset-1$. In non-NTN systems, K may be considered as the processing time for the terminal device to decode NPDSCH and prepare the ACK/NACK feedback. $K_0'$ is indicated by the ACK/NACK resource field in the corresponding DCI. K_offset is a parameter introduced in IoT NTN of the Rel-17 protocol to enhance a timing relationship involving the DL-UL interaction. The value of K_offset varies across GEO, LEO1200, LEO600, and MEO.

The HARQ feedback for NPDSCH 420 is carried by the NPUSCH 430 sent by the terminal device. The network device sends NPDCCH 440 3 ms after receiving NPUSCH 430.

The channel transmission between the network device and the terminal device at the physical layer is related to the MAC CE activation timing. As shown in FIG. 4, when sending NPDCCH 440, the MAC CE activation time occurs 3 ms after the terminal device sends the HARQ feedback. Therefore, HARQ with feedback is crucial for certain MAC CE activation timings.

Multi-Transport Blocks (TBs) Scheduling

In some protocols (e.g., Rel-16), multi-TBs scheduling has been introduced to reduce control channel overhead and improve data rates. Taking NB-IoT as an example, multi-TBs scheduling for unicast has been introduced in deep coverage areas.

As mentioned above, NB-IoT has 2 HARQ processes. The maximum number of transport blocks that can be scheduled by DCI is two, to maintain the same soft buffer size as the traditional terminal device. If two transport blocks are transmitted in an interleaved manner (with npdsch MultiTB set to "interleaved"), and HARQ ACK binding is configured, the terminal device may bind the HARQ feedback of the two transport blocks in NPUSCH format 2.

Multi-TBs scheduling may also be applied in other application scenarios, such as eMTC scenarios or related applications in NR. When DCI performs the multi-TBs scheduling, the plurality of transport blocks may form a large transport block. The HARQ retransmission of the large transport block may be either continuous or interleaved.

As previously mentioned, certain communication systems have significant transmission delays. To reduce overhead, HARQ processes may be selectively enabled or disabled in these communication systems. For example, in NTN systems, the number of HARQ retransmissions may be limited, or HARQ retransmissions may not be allowed. For another example, in eMTC and NB-IoT systems, a HARQ process without feedback may be introduced, i.e., disabling HARQ feedback.

In the HARQ process, the enabling/disabling of HARQ feedback may be configured based on each transport block corresponding to a HARQ process. If HARQ feedback is disabled, there will be no feedback for transmission. Furthermore, the enabling and disabling of HARQ feedback may be used in a mixed manner to configure each related HARQ process.

For eMTC and NB-IoT, the previously mentioned multi-TBs scheduling generally assumes that all transport blocks scheduled by the multi-TBs DCI have enabled HARQ feedback. As transport blocks of the HARQ processes without feedback are mixed in the plurality of transport blocks (or transport block bundles), some of these transport blocks may enable the HARQ feedback while others may disable the HARQ feedback. For example, when applying HARQ disabling to scheduling single DCI of two transport blocks, the HARQ corresponding to the two transport blocks may have different states, meaning one transport block enables HARQ while the other disables HARQ. In this case, the DCI needs to determine how to handle the HARQ feedback for the two transport blocks.

For multi-TBs scheduling, when some transport blocks among a plurality of transport blocks disable HARQ feedback, how to provide unified HARQ feedback for the plurality of transport blocks is an urgent issue to be addressed.

Based on this, an embodiment of the present disclosure provides a method for wireless communication. Through this method, the communication device may determine to enable or disable HARQ processes corresponding to a plurality of transport blocks based on first information. The following describes the embodiments of the present disclosure in details with reference to FIG. 5.

Figure 5:
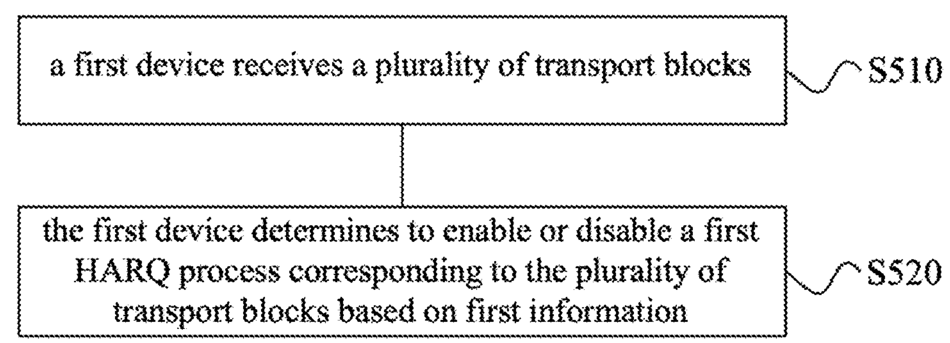
FIG. 5 is a schematic diagram of a method for wireless communication according to an embodiment of the present disclosure.

Refer to FIG. 5. At operation S510, a first device receives a plurality of transport blocks. The first device may be a communication device that performs wireless communication with other devices. The first device may be either a transmitter or a receiver of a wireless communication link.

In some embodiments, the first device may be a network device for the uplink or downlink, or a terminal device for the uplink or downlink. For example, the first device may be an eNB in NB-IoT, or a terminal device within the coverage area of the eNB. For example, the first device may be a base station in an eMTC system, or a machine terminal in the eMTC system.

In some embodiments, the first device may be a terminal device or aerial platform for the service link in an NTN system, or an aerial platform or gateway for the feeder link. The aerial platform may be a satellite or a drone system.

The plurality of transport blocks received by the first device may be at least two transport blocks under multi-TBs scheduling. In some embodiments, multi-TBs scheduling may be applied to a unicast transmission mode of NB-IoT to reduce the control channel overhead in deep coverage areas. In some embodiments, multi-TBs scheduling may be applied in eMTC scenarios. In some embodiments, multi-TBs scheduling may also be applied in three major application scenarios of 5G, such as enhanced mobile broadband (eMBB), ultra reliable & low latency communication (uRLLC), or massive machine-type communication (mMTC).

In some embodiments, the first device may configure multi-TBs scheduling through higher-layer parameters. For example, the network device may configure multi-TBs scheduling through the parameter 'npusch MultiTB Config.' The transmission mode of the plurality of transport blocks may be interleaved or contiguous, which is not limited herein.

In some embodiments, the HARQ process of multi-TBs scheduling may be scheduled via DCI. For example, when two transport blocks of NB-IoT are scheduled by a single DCI, a HARQ process ID of a first transport block may be 0, and a HARQ process ID of a second transport block may be 1. For example, when the plurality of transport blocks are scheduled by multi-TBs DCI, the plurality of transport blocks may correspond to a single HARQ process.

The plurality of transport blocks may provide feedback for the corresponding HARQ process according to the configuration. In some embodiments, based on configuration parameters of the HARQ process or other parameter configuration requirements of higher-layer signaling, the plurality of transport blocks may provide unified HARQ feedback. For example, when configuring the higher-layer parameter HARQ AckBundling, the plurality of transport blocks correspond to a single HARQ process. For this HARQ process, the first device may generate a HARQ NACK-ACK bit and report it uniformly on corresponding information bits. In some embodiments, when HARQ AckBundling is not configured and there are no other signaling requirements, the first device may use a codebook mechanism of type 1 to perform HARQ feedback based on reception status of the plurality of transport blocks.

The plurality of transport blocks may include transport blocks disabling HARQ feedback and/or transport blocks not disabling HARQ feedback. In some embodiments, the plurality of transport blocks may include at least one transport block disabling HARQ feedback. In some embodiments, the number of transport blocks disabling HARQ feedback may be less than a total number of transport blocks under multi-TBs scheduling. For example, a proportion of transport blocks disabling HARQ feedback among the plurality of transport blocks may be 50%. In some embodiments, the number of transport blocks disabling HARQ feedback may equal the total number of transport blocks under multi-TBs scheduling. That is, all transport blocks among the plurality of transport blocks have information about disabling HARQ feedback. In some embodiments, all transport blocks among the plurality of transport blocks may not disable HARQ feedback.

As a possible implementation, in NB-IoT, the maximum number of transport blocks that DCI can schedule is two, and the number of transport blocks disabling HARQ feedback is one. That is, the HARQ feedback corresponding to the two transport blocks is different, i.e., one transport block disables HARQ feedback, while the other does not disable HARQ feedback.

In some embodiments, the transport block disabling HARQ feedback may be the transport block corresponding to a HARQ process without feedback. That is, the first device receiving this transport block does not need to perform HARQ feedback based on the transmission status, and a device sending this transport block also does not wait for the corresponding HARQ feedback. The transport block disabling HARQ feedback can reduce overhead in high-latency systems. As a possible implementation, after the first device receives this transport block, it may not perform any feedback. As another possible implementation, after the first device receives this transport block, it may not consider the decoding status and directly feed back ACK, NACK, or other feedback values determined by higher-layer signaling, but the device sending this transport block does not perform related actions based on the feedback values. For example, the first device may report ACK for the corresponding feedback disabled HARQ process without considering a decoding result of PDSCH.

In some embodiments, the transport block disabling HARQ feedback may be implemented by introducing indication information for HARQ feedback disablement in multi-TBs scheduling. As a possible implementation, the information indicating HARQ feedback disablement may be in the MAC CE corresponding to the transport block, or in the radio resource control (RRC) signaling or DCI information. As a possible implementation, the indication information may be some indication flags, for example, an off flag corresponding to a transport block may be used to indicate that the transport block disables HARQ feedback.

In some embodiments, whether the transport block disables HARQ feedback may be determined based on a type of service. For example, the types of services that disable or enable HARQ may be separately set in RRC signaling. For another example, the enabling and disabling HARQ of the transport block may be managed categorically based on the type of service.

In some embodiments, when the plurality of transport blocks include transport blocks disabling and not disabling HARQ feedback, the first device may provide feedback separately for transport blocks with different HARQ feedback statuses. For example, in multi-TBs scheduling without HARQ AckBundling, if it includes a plurality of transport blocks disabling HARQ feedback, the first device may consistently report ACK only for the HARQ process with feedback disabled, while other transport blocks provide corresponding feedback based on decoding results.

At operation S520, the first device determines to enable or disable a first HARQ process corresponding to the plurality of transport blocks based on first information. The first HARQ process is a process corresponding to the plurality of transport blocks for unified HARQ feedback, aimed at reducing the overhead of the control channel under multi-TBs scheduling. In some embodiments, the first device may provide unified HARQ feedback for the plurality of transport blocks by enabling the first HARQ process. For example, the first device may decode the PDSCH and perform relevant calculations of NACK-ACK on each transport block to generate a HARQ feedback bit based on a decoding result. In some embodiments, the first device may provide no feedback for the plurality of transport blocks by disabling the first HARQ process. In some embodiments, the first device may directly feed back ACK or NACK without decoding by disabling the first HARQ process.

In some embodiments, the enabling or disabling of the first HARQ process by the first device may be indicated through RRC proprietary signaling or system information block (SIB) signaling.

The enabling or disabling of the first HARQ process may be determined based on the first information to achieve unified feedback for the plurality of transport blocks by the first device.

In some embodiments, the first information may include information about transport blocks that disable HARQ feedback among the plurality of transport blocks, or information about transport blocks that do not disable HARQ feedback among the plurality of transport blocks. For example, the first information may be the number of transport blocks disabling HARQ feedback.

In some embodiments, when the number of transport blocks disabling HARQ feedback is equal to the number of transport blocks not disabling HARQ feedback, the first information may be determined based on a first operation. Through simple operations related to HARQ feedback, the first information may be quickly determined. As a possible implementation, the first operation may be a logical AND operation or a logical OR operation.

Taking two transport blocks in NB-IoT as an example, there may be a scenario where the HARQ feedback for the two transport blocks is different, i.e., one transport block disables HARQ feedback while the other transport block does not disable HARQ feedback. If the first operation is a logical AND operation, the first information may indicate that both transport blocks disable HARQ feedback. That is, the first device may disable the first HARQ process corresponding to both transport blocks. If the first operation is a logical OR operation, the first information may indicate that both transport blocks do not disable HARQ feedback. That is, the first device may enable the first HARQ process corresponding to both transport blocks.

For eMTC scenarios or other application scenarios, if the number of transport blocks disabling HARQ feedback is equal to the number of transport blocks not disabling HARQ feedback, the first information may be determined based on a logical AND operation or a logical OR operation or based on other operation methods.

In some embodiments, the first information indicates that all transport blocks in the multi-TBs scheduling are transport blocks disabling HARQ feedback. That is, the number of transport blocks disabling HARQ feedback is equal to a total number of transport blocks used for the HARQ process. Based on the first information, the first device may disable the first HARQ process. In this case, when the HARQ process is disabled, the first device may provide no feedback at all, or it may report ACK, NACK, or other feedback values configured by higher-layer signaling at ACK-NACK information bits of those TBs.

In some embodiments, the first information may be determined based on the transport blocks disabling HARQ feedback. That is, the first device may determine whether to disable the first HARQ process based on the information of the transport blocks disabling HARQ feedback. The information of the transport blocks disabling HARQ feedback may be the number of transport blocks, types of services carried by the transport blocks, or application scenarios of the services.

As a possible implementation, the first information may include the number of transport blocks disabling HARQ feedback. The enabling or disabling of the first HARQ process may be determined based on the first information and a first threshold. The first threshold may be determined based on a second operation performed on the first information.

As a possible implementation, the second operation may be statistic on a proportion of the number of transport blocks disabling HARQ feedback among all transport blocks, with the first threshold being a value less than or equal to 1. If a result of the second operation is greater than or equal to the first threshold, the first device may uniformly disable the HARQ feedback for the plurality of transport blocks to reduce overhead. That is, if a proportion of the number of transport blocks disabling HARQ feedback among the plurality of transport blocks is greater than or equal to the first threshold, the first HARQ process is in a disabled state. The value of the first threshold may be 0.6 or 0.75.

As another possible implementation, the second operation may be calculating a ratio of the number of transport blocks disabling HARQ feedback to the number of transport blocks not disabling HARQ feedback, with the first threshold being any value greater than 0. When the first threshold is 1, the number of transport blocks disabling HARQ feedback is equal to the number of transport blocks not disabling HARQ feedback. Specifically, the plurality of transport blocks include transport blocks disabling HARQ feedback as well as transport blocks feeding back ACK and/or NACK. If the result of the second operation is greater than or equal to the first threshold, the first device may uniformly disable the HARQ feedback for the plurality of transport blocks. For example, the first HARQ process is in a disabled state if the number of transport blocks disabling HARQ feedback meets the following condition, otherwise, the first HARQ process is in an enabled state:

$$N_{off}/(N_{ACK}+N_{NACK}) \geq \text{target}_1$$

where $N_{off}$ represents the number of the transport blocks disabling HARQ feedback, $N_{ACK}$ represents a number of the transport blocks feeding back ACK, $N_{NACK}$ represents a number of transport blocks feeding back NACK, and $\text{target}_1$ represents the first threshold. The first threshold may be a value greater than or equal to 1.5.

As yet another possible implementation, the first threshold may be set via the system. For example, the system may associate the first threshold with the QoS of the service or with the application scenario of the service.

In some embodiments, the first information may be determined based on the transport blocks not disabling HARQ feedback. The transport blocks not disabling HARQ feedback may include transport blocks feeding back ACK and/or transport blocks feeding back NACK in the plurality of transport blocks. The information of the transport blocks not disabling HARQ feedback may be the number of transport blocks, the types of services carried by the transport blocks, or the application scenarios of the services.

As a possible implementation, the first information may include the number of transport blocks not disabling HARQ feedback. The enabling or disabling of the first HARQ process may be determined based on the first information and a second threshold. The second threshold may also be determined based on the second operation performed on the first information.

As a possible implementation, the second operation may be statistic on a proportion of the number of transport blocks not disabling HARQ feedback among all transport blocks, with the first threshold being a value less than 1. If the result of the second operation is greater than or equal to the second threshold, the first device may uniformly enable the HARQ feedback for the plurality of transport blocks to meet the QoS requirements. For example, if the proportion of the number of transport blocks not disabling HARQ feedback among the plurality of transport blocks is greater than the second threshold, the first HARQ process is in an enabled state.

As another possible implementation, the second threshold may also be set via the system. For example, the system may associate the second threshold with the QoS of the service or with the application scenario of the service.

When the first device determines that the first HARQ process is in the enabled state based on the first information, it needs to generate a HARQ codebook based on the information of the plurality of transport blocks. By transmitting the HARQ codebook, unified feedback for the plurality of transport blocks may be achieved. As a possible implementation, the HARQ codebook may be determined based on information of the transport blocks feeding back ACK/NACK in the plurality of transport blocks.

In some embodiments, the first information may be determined based on the transport blocks feeding back ACK in the plurality of transport blocks. That is, the first device may determine whether to enable the first HARQ process based on the information of the transport blocks feeding back ACK. The information of the transport blocks feeding back ACK may be the number of transport blocks, the types of services carried by the transport blocks, or the application scenarios of the services.

As a possible implementation, the first information may include the number of transport blocks feeding back ACK. The enabling or disabling of the first HARQ process may be determined based on the first information and a third threshold. The third threshold may also be determined based on the second operation performed on the first information.

As a possible implementation, the second operation may be statistic on a proportion of the number of transport blocks feeding back ACK among all transport blocks, with the third threshold being in a range of 0 to 1. If the result of the second operation is greater than or equal to the third threshold, the first device may uniformly enable the HARQ feedback for the plurality of transport blocks. That is, if the proportion of transport blocks feeding back ACK among the plurality of transport blocks is greater than or equal to the third threshold, the first HARQ process is in the enabled state.

As another possible implementation, the second operation may be calculating a ratio of the number of transport blocks feeding back ACK to the number of other transport blocks, with the third threshold being a value greater than 0. If the result of the second operation is greater than or equal to the third threshold, the first device may uniformly enable the HARQ feedback for the plurality of transport blocks. For example, the first HARQ process is in the enabled state if the number of transport blocks feeding back ACK meets the following condition:

$$N_{ACK}/(N_{NACK}+N_{off}) \geq \text{target}_3;$$

where $N_{ACK}$ represents the number of the transport blocks feeding back ACK, $N_{NACK}$ represents a number of the transport blocks feeding back NACK, $N_{off}$ represents a number of the transport blocks disabling HARQ feedback, and $\text{target}_3$ represents the third threshold.

As yet another possible implementation, the third threshold may also be set via the system. For example, the system may associate the third threshold with the QoS of the service or with the application scenario of the service.

If the number of transport blocks feeding back ACK is greater than the third threshold in any of the above cases, the first device may enable the first HARQ process. Furthermore, the first device may uniformly report ACK in the information bits corresponding to the plurality of transport blocks. That is, feedback information of the first HARQ process regarding the plurality of transport blocks is ACK.

In some embodiments, the first information may be determined based on the transport blocks feeding back NACK among the plurality of transport blocks. That is, the first device may determine whether to enable the first HARQ process based on the information of the transport blocks feeding back NACK. The information of the transport blocks feeding back NACK may be the number of transport blocks, the types of services carried by the transport blocks, or the application scenarios of the services.

As a possible implementation, the first information may include the number of transport blocks feeding back NACK. The enabling or disabling of the first HARQ process may be determined based on the first information and a fourth threshold. The fourth threshold may also be determined based on the second operation performed on the first information.

As a possible implementation, the second operation may be statistic on a proportion of the number of transport blocks feeding back NACK among all transport blocks, with the fourth threshold being in the range of 0 to 1. If the result of the second operation is greater than or equal to the fourth threshold, the first device may uniformly enable the HARQ feedback for the plurality of transport blocks. That is, if the proportion of transport blocks feeding back NACK among the plurality of transport blocks is greater than or equal to the fourth threshold, the first HARQ process is in the enabled state.

As another possible implementation, the second operation may be calculating a ratio of the number of transport blocks feeding back NACK to the number of other transport blocks, with the fourth threshold being a value greater than 0. If the result of the second operation is greater than or equal to the fourth threshold, the first device may uniformly enable the HARQ feedback for the plurality of transport blocks. For example, the first HARQ process is in the enabled state if the number of transport blocks feeding back NACK meets the following condition:

$$N_{NACK}/(N_{ACK}+N_{off}) \geq \text{target}_4;$$

where $N_{NACK}$ represents the number of the transport blocks feeding back NACK, $N_{ACK}$ represents a number of the transport blocks feeding back ACK, $N_{off}$ represents a number of the transport blocks disabling HARQ feedback, and target represents the fourth threshold.

As yet another possible implementation, the fourth threshold may also be set via the system. For example, the system may associate the fourth threshold with the QoS of the service or with the application scenario of the service.

If the number of transport blocks feeding back NACK is greater than the fourth threshold in any of the above cases, the first device may enable the first HARQ process. Furthermore, the first device may uniformly report NACK in the information bits corresponding to the plurality of transport blocks. That is, feedback information of the first HARQ process regarding the plurality of transport blocks is NACK.

In some embodiments, the ranges of the first threshold, second threshold, third threshold, and fourth threshold may be the same. For example, when calculating the proportion of the first information among the plurality of transport blocks, the four thresholds compared to the calculation result may all be 0.6. In some embodiments, the ranges of the above four thresholds may be different.

In some embodiments, for multi-TBs scheduling in different service scenarios, the first device may provide different feedback based on service types or adopt similar feedback schemes. For example, for different service types, the ranges of the ranges of the plurality of thresholds as described above may be the same.

Based on FIG. 5, the first device may determine whether to enable or disable the HARQ process corresponding to the plurality of transport blocks based on the first information. The first information may be related to the number of transport blocks with different feedback statuses among the plurality of transport blocks, to determine a unified feedback method for the plurality of transport blocks.

Taking the first device as a terminal device as an example, the terminal device may receive DCI on the PDCCH from the network device, and the DCI indicates a physical downlink shared channel (PDSCH). The terminal device may receive a MAC CE command on the PDSCH. Based on the DCI, the terminal device may determine whether HARQ feedback for data reception on the PDSCH needs to be transmitted. The terminal device may determine the plurality of transport blocks under multi-TBs scheduling via the method described above, and the terminal device may determine a single transport block directly.

As mentioned above, in certain control processes of MAC CE, HARQ feedback serves as a time basis for activation timing. Based on this situation, if it is determined that NACK/ACK feedback needs to be transmitted, the terminal device may send the NACK/ACK message. After the network device receives the NACK/ACK message, the MAC CE process may be enabled as normal. If the terminal device determines that NACK/ACK feedback does not need to be transmitted, it disables the HARQ process but may transmit feedback values according to higher-layer signaling. In this case, the MAC CE may still be enabled as normal. However, if the terminal device does not provide any feedback, the network device cannot receive the feedback message, and how to define and synchronize the MAC CE activation timing between the network device and the terminal device is also a problem needs to be addressed.

Figure 6:
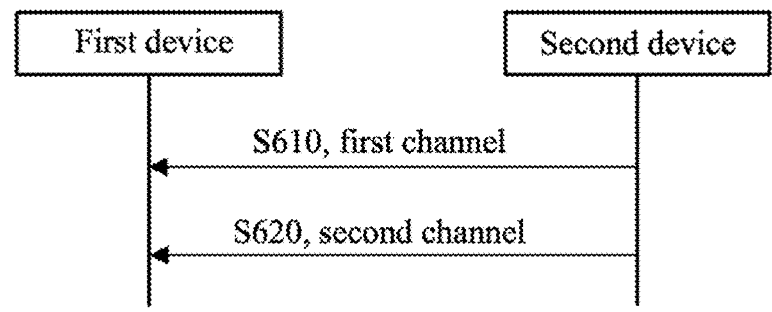
FIG. 6 is another schematic diagram of a method for wireless communication according to an embodiment of the present disclosure.

Based on this, an embodiment of the present disclosure further provides a method for wireless communication. Through this method, the time basis for MAC CE activation timing between communication devices is ensured even in the absence of any HARQ feedback. The method for wireless communication is described in detail below with reference to FIG. 6. It should be understood that the technical problems addressed by the method shown in FIG. 6 are related to FIG. 5. Therefore, for brevity, the terms that have appeared in FIG. 5 will not be explained in FIG. 6 in detail again.

The method for communication shown in FIG. 6 is introduced from the perspective of mutual communication between a first device and a second device. The first device and the second device in FIG. 6 may be communication devices at both ends of the communication link. The first device may be any communication device described in FIG. 5.

The first device and the second device may respectively be a receiving end and a sending end of a wireless communication link. In some embodiments, the first device and the second device may be the terminal device and the base station in the downlink, or the base station and the terminal device in the uplink. In some embodiments, the first device and the second device may be the terminal device and the satellite, or the satellite and the terminal device in the service link in the NTN system. In some embodiments, the first device and the second device may be the machine terminal and the base station, or the base station and the machine terminal in the eMTC system.

Referring to FIG. 6, at operation S610, the first device receives a first channel from the second device.

The first channel may be a downlink channel carrying control information or an uplink channel carrying control information. In some embodiments, when the first device is a terminal device, the first channel is a control channel from the network device, and the control information is DCI. The first channel may be, for example, PDCCH, or NPDCCH in the NB IoT system. In some embodiments, when the first device is a network device, the control information may be information from the terminal device.

The control information carried by the first channel may include a trigger condition corresponding to MAC CE, such as a first trigger condition. That is, the first channel may be used to send the first trigger condition corresponding to MAC CE. In some embodiments, the first trigger condition may indicate an activation condition of MAC CE.

In some embodiments, the control information carried by the first channel may also include indication information for data transmission. The data to be transmitted may be transmitted via a second channel. That is, the control information carried by the first channel may indicate the transmission of transport blocks on the second channel.

The first trigger condition may be used to indicate a trigger condition corresponding to MAC CE after the first device receives the second channel. That is, the first trigger condition is not the trigger condition for data transmission indicated by the control information carried by the first channel, but the trigger condition after the first device receives the second channel carrying the transmission data. Therefore, the first trigger condition may be related to the enabling of MAC CE after the above NACK/ACK feedback.

In some embodiments, the first trigger condition may be used to define the activation timing of MAC CE. For example, the first trigger condition may indicate that MAC CE is enabled 3 ms after receiving HARQ feedback. In some embodiments, the first channel may synchronize MAC CE activation times between communication devices. For example, the first trigger condition may determine the synchronization of MAC CE between the terminal device and the network device based on the same time basis.

As a possible implementation, the first trigger condition may be an activation condition when MAC CE cannot be enabled as normal. For example, when MAC CE cannot receive ACK/NACK feedback, it may be activated based on a time basis determined by the first trigger condition. That is, if the transport block received by the first device disables HARQ feedback and does not provide any feedback, MAC CE may be enabled based on the first trigger condition.

The first trigger condition may be determined based on one or more pieces of information, which are explained in detail in conjunction with operation S620.

At operation S620, the first device receives a second channel from the second device.

The second channel may be a downlink channel carrying transmission data or information, or an uplink channel carrying transmission data or information. In some embodiments, when the first device is a terminal device, the second channel may be a shared channel for the network device to send the transport blocks. The second channel may be, for example, PDSCH, or NPDSCH in the NB IoT system. The shared channel may be sent through the triggering of the control channel. In some embodiments, when the first device is a network device, the second channel may be a shared channel, such as PUSCH, for the terminal device to send data. In some embodiments, the second channel may be an uplink or downlink channel carrying feedback information.

The transmission data carried by the second channel may be one or more transport blocks. In some embodiments, the second channel may carry the plurality of transport blocks under multi-TBs scheduling. In some embodiments, the second channel may carry a large transport block formed by the plurality of transport blocks. In some embodiments, the second channel may carry a single transport block.

The transport blocks carried by the second channel may be indicated by the first channel. In some embodiments, the first channel may indicate the transmission of transport blocks through the control information it carries. The transport blocks may be sent over the shared channel. For example, DCI may indicate the sending of PDSCH carrying the transport blocks.

The second channel may be used to carry transport blocks disabling HARQ feedback. That is, the second channel may carry transport blocks disabling HARQ feedback as indicated by the first channel. In some embodiments, the second channel carries the plurality of transport blocks under multi-TBs scheduling, including the transport blocks disabling HARQ feedback. In some embodiments, the second channel carries transmission data of one HARQ process corresponding to each transport block.

A part or all of the transport blocks carried by the second channel disable HARQ feedback. In some embodiments, the transport blocks disabling HARQ feedback may be indicated through RRC proprietary signaling. In some embodiments, the transport blocks disabling HARQ feedback in NPDSCH may be indicated through the previous DCI. The first device may determine whether HARQ feedback for the transport blocks carried by the second channel needs to be transmitted based on the DCI.

In some embodiments, whether HARQ feedback needs to be transmitted is related to the first trigger condition. In the case where HARQ feedback needs to be transmitted, MAC CE may be enabled as normal without needing to add the first trigger condition. In the case where HARQ feedback does not need to be transmitted, the first trigger condition may be used to ensure the time basis for MAC CE activation timing between communication devices. For example, when the first device is a terminal device and it determines that HARQ feedback corresponding to the transport block does not need to be transmitted, it may send indication information to the network device to ensure the synchronization of activation timing between the terminal device and the network device. For example, the terminal device may send indication information through a HARQ process, such as the first HARQ process.

As mentioned above, the first trigger condition may be determined based on one or more pieces of information.

In some embodiments, the first trigger condition may be determined based on the first HARQ process added by the first device. As a possible implementation, the first trigger condition may be determined based on a time domain position of sending the feedback of the first HARQ process. That is, the first HARQ process may be used by the first device to send indication information. This indication information may serve as the first trigger condition for MAC CE activation timing. For example, MAC CE may be timed to start 3 ms after the first device sends the feedback of the first HARQ process.

As a possible implementation, the indication information may correspond to the transport block disabling HARQ feedback. That is, the indication information may be equivalent to the feedback information sent when the transport block enables HARQ feedback. The indication information may be a disablement indication. For example, the terminal device may directly feedback ACK, NACK, or off information based on higher-layer signaling without considering the decoding result of the transport block. Based on this feedback information, MAC CE may be enabled according to the normal procedure.

As a possible implementation, the first HARQ process may be a newly added HARQ process by the first device for sending the indication information. In other words, the first device may initiate a new HARQ process. Taking the NB-IoT system as an example, the number of HARQ processes for the terminal device may increase from a maximum of 2 to 3. For the eMTC system, the terminal device may also add a HARQ process.

As a possible implementation, the first HARQ process may correspond to the transport block disabling HARQ feedback to ensure the MAC CE activation timing when there is no HARQ feedback. That is, after the first device confirms that the transport block disables HARQ feedback, the first HARQ process is a new HARQ process initiated by the first device for the transport block.

As a possible implementation, the first HARQ process may not be set with a corresponding buffer. That is, the first device may not set a corresponding buffer area for the first HARQ process. When the first device is a terminal device, existing buffer or memory settings of the terminal device meet the technical requirements. In other words, the terminal device has added a HARQ process, but it does not need to set a corresponding soft buffer for this HARQ process. For example, in the NB-IoT system, even after the HARQ processes become 3, storage buffers of the terminal device remain a maximum of two buffers.

It should be noted that the first HARQ process in the method shown in FIG. 6 is not exactly the same as the first HARQ process shown in FIG. 5. Specifically, the first HARQ process shown in FIG. 5 corresponds to the plurality of transport blocks under multi-TBs scheduling, while the first HARQ process shown in FIG. 6 may correspond to one or more transport blocks. The first HARQ process shown in FIG. 6 may not be set with a corresponding buffer, while the first HARQ process shown in FIG. 5 may require to be set with a corresponding buffer.

In some embodiments, the first trigger condition may be determined based on a first time unit. That is, an activation time of MAC CE may be based on a time basis of the first time unit rather than a time of receiving NACK-ACK. The first time unit may be a time length based on a time domain position of the second channel. As a possible implementation, MAC CE may start timing after waiting for the time length indicated by the first time unit with the time domain position of the second channel as the time basis. For example, the time basis may be a time domain position of the last time slot corresponding to the second channel.

As a possible implementation, the first time unit may include a first processing time for the terminal device to decode data and/or prepare HARQ feedback. For example, with reference to relevant specifications, the first time unit may include a duration of 12 ms between the end of NPDSCH and the start of the corresponding HARQ-ACK.

As a possible implementation, the first time unit may further include a specified waiting time, such as a first waiting time. Taking the terminal device as an example, the terminal device may specify the first waiting time based on information provided by the network device. The first waiting time may be related to a timing advance (TA) value corresponding to MAC CE. For example, when the network device provides information about the time and/or frequency of the uplink, the terminal device may specify a waiting time T for the MAC CE command related to TA.

As a possible implementation, the first waiting time may be related to the scheduling offset or propagation delay information of the service link or feeder link in the NTN system. As another possible implementation, the first waiting time may also be the same as the waiting time after the network device receives NACK/ACK feedback, which is 3 ms.

As a possible implementation, the first time unit may include the above first processing time and first waiting time. For example, in the NB-IoT system, the network device may wait for a time interval of 12 ms+T after sending NPDSCH, and then send a next NPDCCH based on MAC CE.

In some embodiments, the first time unit may be determined based on a number of time slots after the time domain position of the second channel.

As a possible implementation, the number of time slots may be determined with reference to other commands related to the MAC CE activation timing, thereby unifying the time basis for MAC CE activation actions. These related commands may include TA and commands related to a discontinuous reception (DRX) mode and a long DRX mode. Taking the DRX mode as an example, after receiving the PDSCH indicated by the DRX, a certain number of time slots should be waited before performing the relevant actions. The number of time slots related to the first time unit may be the same as the certain number of time slots or determined based on the certain number of time slots.

As another possible implementation, the first time unit may be a specified number of time slots. For example, the first time unit may be N time slots after the time domain position of the second channel, where N is an integer greater than 1.

Figure 7:
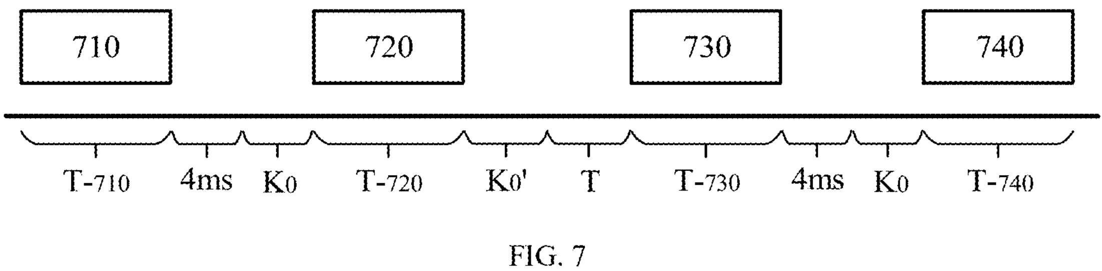
FIG. 7 is a schematic diagram of activating a transmission channel based on a MAC CE corresponding to a first time unit in the method in FIG. 6.

For case of understanding, taking IoT NTN as an example, the following describes the first time unit including the first waiting time T as well as a process of activating channel transmission based on MAC CE with reference to FIG. 7. Referring to FIG. 7, along the timeline, the network device sequentially sends NPDCCH 710, NPDSCH 720, NPDCCH 730, and NPDSCH 740. Among them, NPDCCH 710 and NPDCCH 730 may be the first channels, while NPDSCH 720 and NPDSCH 740 may be the second channels. The time domain resources required for the network device to send NPDCCH 710, NPDSCH 720, NPDCCH 730, and NPDSCH 740 are $T_{-710}$ to $T_{-740}$, respectively.

Compared with FIG. 4, after the network device sends NPDCCH 710 and NPDCCH 730, it also waits for a time interval of 4 ms+$K_0$ before sending NPDSCH 720 and NPDSCH 740. The difference is that after the network device sends NPDSCH 720, it does not need to wait for the NPUSCH sent by the terminal device. In other words, the MAC CE activation timing for sending NPDCCH 730 is no longer based on NPUSCH as the time basis but is determined according to the first trigger condition related to the first waiting time.

As shown in FIG. 7, after the network device sends NPDSCH 720, it may wait for a time interval of $K_0$'+T before sending NPDCCH 730, where T is the first waiting time, and $K_0$' may be 12 ms.

It is seen from FIG. 4 that when the network device and the terminal device interact with each other, the MAC CE activation timing is no longer based on HARQ feedback, so there is no need to consider the time required for the terminal device to send feedback to the network device.

The method embodiments of the present disclosure are described in detail above with reference to FIG. 1 to FIG. 7. Apparatus embodiments of the present disclosure are described in detail below with reference to FIG. 8 to FIG. 10. It should be understood that the descriptions of the apparatus embodiments correspond to the descriptions of the method embodiments, and therefore, reference may be made to the foregoing method embodiments for parts that are not described in detail.

Figure 8:
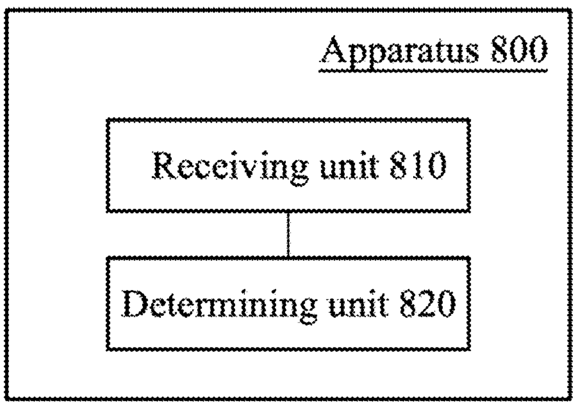
FIG. 8 is a schematic structural diagram of an apparatus for wireless communication according to an embodiment of the present disclosure.

FIG. 8 is a schematic structural diagram of an apparatus for wireless communication according to an embodiment of the present disclosure. The apparatus 800 may be any one of the first devices described above. The apparatus 800 shown in FIG. 8 includes a receiving unit 810 and a determining unit 820.

The receiving unit 810 may be configured to receive a plurality of transport blocks, where the plurality of transport blocks include transport blocks disabling HARQ feedback and/or transport blocks not disabling HARQ feedback.

The determining unit 820 may be configured to determine to enable or disable a first HARQ process corresponding to the plurality of transport blocks based on first information, where the first information is determined based on one or both of the following information: the transport blocks disabling HARQ feedback in the plurality of transport blocks; and the transport blocks not disabling HARQ feedback in the plurality of transport blocks.

Optionally, the first information is the number of transport blocks disabling HARQ feedback, and the enabling or disabling of the first HARQ process is determined based on the first information and a first threshold.

Optionally, the first HARQ process is in a disabled state if a proportion of the number of the transport blocks disabling HARQ feedback in the plurality of transport blocks is greater than or equal to the first threshold.

Optionally, the transport blocks not disabling HARQ feedback include transport blocks feeding back ACK and/or NACK, and the first HARQ process is in the disabled state when the number of transport blocks disabling HARQ feedback satisfies:

$$N_{off}/(N_{ACK}+N_{NACK}) \geq \text{target}_1;$$

where $N_{off}$ represents the number of the transport blocks disabling HARQ feedback, $N_{ACK}$ represents the number of the transport blocks feeding back ACK in the plurality of transport blocks, $N_{NACK}$ represents a number of transport blocks feeding back NACK in the plurality of transport blocks, and $\text{target}_1$ represents the first threshold.

Optionally, the first information is the number of transport blocks not disabling HARQ feedback, and the enabling or disabling of the first HARQ process is determined based on the first information and a second threshold.

Optionally, the first HARQ process is in an enabled state if a proportion of the number of transport blocks not disabling HARQ feedback in the plurality of transport blocks is greater than the second threshold.

Optionally, the transport blocks not disabling HARQ feedback include one or both of the following: transport blocks feeding back ACK in the plurality of transport blocks; and transport blocks feeding back NACK in the plurality of transport blocks.

Optionally, the first information is the number of the transport blocks feeding back ACK, and the enabling or disabling of the first HARQ process is determined based on the first information and a third threshold.

Optionally, the first HARQ process is in an enabled state if a proportion of the number of transport blocks feeding back ACK in the plurality of transport blocks is greater than or equal to the third threshold.

Optionally, the first HARQ process is in an enabled state when the number of the transport blocks feeding back ACK satisfies:

$$N_{ACK}/(N_{NACK}+N_{off}) \geq \text{target}_3;$$

where $N_{ACK}$ represents the number of the transport blocks feeding back ACK, $N_{NACK}$ represents the number of the transport blocks feeding back NACK, $N_{off}$ represents the number of the transport blocks disabling HARQ feedback, and $\text{target}_3$ represents the third threshold.

Optionally, feedback information of the first HARQ process regarding the plurality of transport blocks is ACK.

Optionally, the first information is the number of the transport blocks feeding back NACK, and the enabling or disabling of the first HARQ process is determined based on the first information and a fourth threshold.

Optionally, the first HARQ process is in an enabled state if a proportion of the number of the transport blocks feeding back NACK in the plurality of transport blocks is greater than or equal to the fourth threshold.

Optionally, the first HARQ process is in an enabled state when the number of the transport blocks feeding back NACK satisfies:

$$N_{NACK}/(N_{ACK}+N_{off}) \geq \text{target}_4;$$

where $N_{NACK}$ represents the number of the transport blocks feeding back NACK, $N_{ACK}$ represents the number of the transport blocks feeding back ACK, $N_{off}$ represents the number of the transport blocks disabling HARQ feedback, and $\text{target}_4$ represents the fourth threshold.

Optionally, feedback information of the first HARQ process regarding the plurality of transport blocks is NACK.

Optionally, the first information is determined based on a first operation if the number of the transport blocks disabling HARQ feedback in the plurality of transport blocks is equal to the number of the transport blocks not disabling HARQ feedback.

Figure 9:
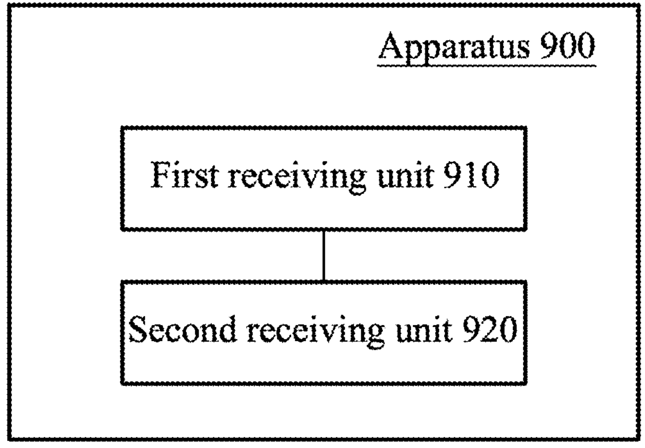
FIG. 9 is another schematic structural diagram of an apparatus for wireless communication according to an embodiment of the present disclosure.

FIG. 9 is another schematic structural diagram of an apparatus for wireless communication according to an embodiment of the present disclosure. The apparatus 900 may be any of the first devices described above. The apparatus 900 shown in FIG. 9 includes a first receiving unit 910 and a second receiving unit 920.

The first receiving unit 910 may be configured to receive a first channel, where the first channel is used to send a first trigger condition, and the first trigger condition is used to indicate a trigger condition corresponding to a MAC CE after the first device receives a second channel.

The second receiving unit 920 is configured to receive the second channel, where the second channel is used to carry transport blocks disabling HARQ feedback that are indicated by the first channel; where the first trigger condition is determined based on one or both of: a first HARQ process, where the first HARQ process is used for the first device to send indication information, and the indication information corresponds to the transport blocks disabling HARQ feedback; and a first time unit based on a time domain position of the second channel.

Optionally, the first time unit includes a first waiting time, and the first waiting time is related to a TA value corresponding to the MAC CE.

Optionally, the first time unit is determined by a number of time slots after the time domain position of the second channel.

Optionally, the first HARQ process is not set with a corresponding buffer.

Figure 10:
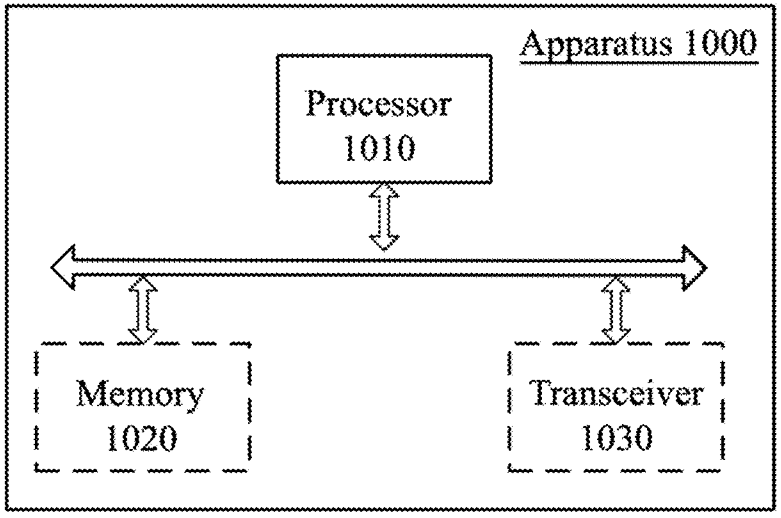
FIG. 10 is a schematic structural diagram of an apparatus for communication according to an embodiment of the present disclosure.

FIG. 10 is a schematic structural diagram of an apparatus for communication according to an embodiment of the present disclosure. The dashed line in FIG. 10 indicates that the unit or module is optional. The apparatus 1000 may be configured to implement the method described in the foregoing method embodiments. The apparatus 1000 may be a chip or a terminal device.

The apparatus 1000 may include one or more processors 1010, and the processor 1010 may support the apparatus 1000 to implement the method described in the foregoing method embodiments. The processor 1010 may be a general-purpose processor or a dedicated processor. For example, the processor may be a central processing unit (CPU). Alternatively, the processor may be another general-purpose processor, a digital signal processor (DSP), an application specific integrated circuit (ASIC), a field programmable gate array (FPGA) or other programmable logic devices, a discrete gate or transistor logic device, a discrete hardware component, or the like. The general-purpose processor may be a microprocessor, or the processor may be any conventional processor or the like.

The apparatus 1000 may further include one or more memories 1020 storing a program, and the program may be executed by the processor 1010 to cause the processor 1010 to perform the method described in the foregoing method embodiments. The memory 1020 may be independent of the processor 810 or may be integrated into the processor 1010.

The apparatus 1000 may further include a transceiver 1030, and the processor 1010 may communicate with another device or chip via the transceiver 1030. For example, the processor 1010 may perform data transceiving with another device or chip via the transceiver 1030.

Embodiments of the present disclosure further provide a computer-readable storage medium, configured to store a program. The computer-readable storage medium may be applied to the terminal device or network device provided in the embodiments of the present disclosure, and the program causes the computer to perform the method performed by the terminal or network device in the embodiments of the present disclosure.

The computer-readable storage medium may be any usable medium readable by a computer, or a data storage device, such as a server or a data center including one or more integrated usable media. The usable medium may be a magnetic medium (e.g., a floppy disk, a hard disk, or a magnetic tape), an optical medium (e.g., a digital video disk (DVD)), a semiconductor medium (e.g., a solid state disk (SSD)), or the like.

Embodiments of the present disclosure further provide a computer program product. The computer program product includes a program. The computer program product may be applied to the terminal device or network device provided in the embodiments of the present disclosure, and the program causes the computer to perform the method performed by the terminal or network device in the embodiments of the present disclosure.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium, for example, the computer instructions may be transmitted from a website, a computer, a server, or a data center to another website, computer, server, or data center in a wired (e.g., a coaxial cable, an optical fiber, a digital subscriber line (DSL)) or a wireless (e.g., infrared, wireless, microwave, etc.) manner.

Embodiments of the present disclosure further provide a computer program. The computer program may be applied to the terminal device or network device provided in the embodiments of the present disclosure, and the computer program causes the computer to perform the method performed by the terminal or network device in the embodiments of the present disclosure.

The terms "system" and "network" in the present disclosure may be used interchangeably. In addition, the terms used in the present disclosure are merely used to explain specific embodiments of the present disclosure and are not intended to limit the present disclosure. In the description, claims, and accompanying drawings of the present disclosure, the terms "first", "second", "third", "fourth", and the like are used to distinguish different objects rather than describe a specific order. In addition, the terms "including" and "having" and any variations thereof are intended to cover non-exclusive inclusion.

The term "indication" mentioned in the embodiments of the present disclosure may be a direct indication, or may be an indirect indication, or may indicate that there is an association relationship. For example, A indicates B, which may indicate that A directly indicates B, e.g., B is obtained through A, or may indicate that A indirectly indicates B, e.g., A indicates C and B is obtained through C, or may indicate that A and B have an association relationship.

In the embodiments of the present disclosure, the term "corresponding" may indicate that there is a direct correspondence or indirect correspondence between the two, or may indicate that there is an association relationship between the two, or may be relationships such as indicating and being indicated, configuring and being configured, etc.

In the embodiments of the present disclosure, the term "protocol" in the embodiments of the present disclosure may refer to a standard protocol in the field of communications, such as an LTE protocol, an NR protocol, and related protocols applied to a future communication system, which is not limited in the present disclosure.

In the embodiments of the present disclosure, determining B based on A does not mean determining B solely based on A, B may also be determined based on A and/or other information.

In the embodiments of the present disclosure, the term "and/or" in this specification is merely an association relationship for describing associated objects, indicating that there are three relationships, e.g., A and/or B may indicate that A exists alone, A and B exist at the same time, and B exists alone. In addition, the character "/" in this specification generally indicates an "or" relationship between the associated objects.

In various embodiments of the present disclosure, a size of a serial number of each process does not mean an execution sequence, and the execution sequence of each process should be determined by its function and internal logic but should not constitute any limitation on an implementation process of the embodiments of the present disclosure.

In the several embodiments provided in the present disclosure, it should be understood that the disclosed system, apparatus, and method may be implemented in other manners. For example, the apparatus embodiments described above are merely illustrative, and the division of the units is merely a logical function division. In actual implementation, there may be alternative division manners, such as combining a plurality of units or components or integrating them into another system, or ignoring or not executing some features. In addition, the shown or discussed mutual coupling or direct coupling or communication connection may be indirect coupling or communication connection through some interfaces, devices, or units, which may be electrical, mechanical, or in other forms.

The units described as separate parts may or may not be physically separate, and parts shown as units may or may not be physical units, i.e., may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The foregoing descriptions are merely specific implementations of the present disclosure, but the protection scope of the present disclosure is not limited thereto, and any changes or substitutions may be easily conceived of by a person skilled in the art within the technical scope disclosed in the present disclosure. Therefore, the protection scope of the present disclosure shall be subject to the protection scope of the claims.

What is claimed is:

1. A method for wireless communication, comprising:

receiving, by a first device, a plurality of transport blocks, wherein the plurality of transport blocks include at least one of transport blocks disabling hybrid automatic repeat request (HARQ) feedback or transport blocks enabling HARQ feedback;

determining, by the first device, to enable or disable a first HARQ process corresponding to the plurality of transport blocks based on first information, wherein the first information is determined based on the transport blocks enabling HARQ feedback in the plurality of transport blocks, and wherein the first information comprises at least a quantity of the transport blocks disabling HARQ feedback or a quantity of the transport blocks enabling HARQ feedback, and wherein the enabling or disabling of the first HARQ process is determined based on the first information and a first threshold or a second threshold; and enabling the first HARQ process or disabling the first HARQ process based on the determining, wherein at least one of the following is true:

the transport blocks enabling HARQ feedback include transport blocks feeding back ACK in the plurality of transport blocks, and wherein enabling or disabling of the first HARQ process is determined based on the first information and a third threshold; or the transport blocks enabling HARQ feedback include transport blocks feeding back NACK in the plurality of transport blocks, and wherein enabling or disabling of the first HARQ process is determined based on the first information and a fourth threshold.

2. The method according to claim 1, wherein the first HARQ process is in a disabled state responsive to that a proportion of the quantity of the transport blocks disabling HARQ feedback in the plurality of transport blocks is greater than or equal to the first threshold.

3. The method according to claim 1, wherein the transport blocks enabling HARQ feedback include transport blocks feeding back acknowledgement (ACK) and/or transport blocks feeding back negative acknowledgement (NACK) and the first HARQ process is in a disabled state responsive to that the quantity of transport blocks disabling HARQ feedback satisfies:

$$N_{off}/(N_{ACK}+N_{NACK})\geq \text{target}_1;$$

wherein $N_{off}$ represents the quantity of the transport blocks disabling HARQ feedback, $N_{ACK}$ represents a number of the transport blocks feeding back ACK, $N_{NACK}$ represents a number of transport blocks feeding back $N_{ACK}$, and $\text{target}_1$ represents the first threshold.

4. The method according to claim 1, wherein the first HARQ process is in an enabled state responsive to that a proportion of the quantity of transport blocks enabling HARQ feedback in the plurality of transport blocks is greater than or equal to the second threshold.

5. The method according to claim 1, wherein the first HARQ process is in an enabled state responsive to that a proportion of a number of transport blocks feeding back ACK in the plurality of transport blocks is greater than or equal to the third threshold.

6. The method according to claim 5, wherein feedback information of the first HARQ process regarding the plurality of transport blocks is the ACK.

7. The method according to claim 1, wherein the first HARQ process is in an enabled state responsive to that a number of the transport blocks feeding back ACK satisfies:

$$N_{ACK}/(N_{NACK}+N_{off})\geq \text{target}_3;$$

wherein $N_{ACK}$ represents the number of the transport blocks feeding back ACK, $N_{NACK}$ represents a number of the transport blocks feeding back NACK, $N_{off}$ represents the quantity of the transport blocks disabling HARQ feedback, and targets represents the third threshold.

8. The method according to claim 1, wherein the first HARQ process is in an enabled state responsive to that a proportion of a number of the transport blocks feeding back NACK in the plurality of transport blocks is greater than or equal to the fourth threshold.

9. The method according to claim 8, wherein feedback information of the first HARQ process regarding the plurality of transport blocks is the NACK.

10. The method according to claim 1, wherein the first HARQ process is in an enabled state responsive to that a number of the transport blocks feeding back NACK satisfies:

$$N_{NACK}/(N_{ACK}+N_{off})\geq \text{target}_4;$$

wherein $N_{NACK}$ represents the number of the transport blocks feeding back NACK, $N_{ACK}$ represents a number of the transport blocks feeding back ACK, $N_{off}$ represents the quantity of the transport blocks disabling HARQ feedback, and $\text{target}_4$ represents the fourth threshold.

11. The method according to claim 1, wherein the first information is determined based on a first operation responsive to that the quantity of the transport blocks disabling HARQ feedback in the plurality of transport blocks is equal to a number of the transport blocks enabling HARQ feedback.

12. An apparatus for communication, comprising a memory and at least one processor, wherein the memory is configured to store a program, and the at least one processor is configured to invoke the program in the memory to perform operations comprising:

receiving a plurality of transport blocks, wherein the plurality of transport blocks include at least one of transport blocks disabling hybrid automatic repeat request (HARQ) feedback or transport blocks enabling HARQ feedback;

determining to enable or disable a first HARQ process corresponding to the plurality of transport blocks based on first information, wherein the first information is determined based on the transport blocks enabling HARQ feedback in the plurality of transport blocks, and wherein the first information comprises at least a quantity of the transport blocks disabling HARQ feedback or a quantity of the transport blocks enabling HARQ feedback, and wherein the enabling or disabling of the first HARQ process is determined based on the first information and a first threshold or a second threshold; and enabling the first HARQ process or disabling the first HARQ process based on the determining, wherein at least one of the following is true:

the transport blocks enabling HARQ feedback include transport blocks feeding back ACK in the plurality of transport blocks, and wherein enabling or disabling of the first HARQ process is determined based on the first information and a third threshold; or the transport blocks enabling HARQ feedback include transport blocks feeding back NACK in the plurality of transport blocks, and wherein enabling or disabling of the first HARQ process is determined based on the first information and a fourth threshold.

13. The apparatus according to claim 12, wherein the first HARQ process is in a disabled state responsive to that a proportion of the quantity of the transport blocks disabling HARQ feedback in the plurality of transport blocks is greater than or equal to the first threshold.

14. The apparatus according to claim 12, wherein the transport blocks enabling HARQ feedback include transport blocks feeding back acknowledgement (ACK) and/or transport blocks feeding back negative acknowledgement (NACK) and the first HARQ process is in a disabled state responsive to that the quantity of transport blocks disabling HARQ feedback satisfies:

$$N_{off}/(N_{ACK}+N_{NACK}) \geq \text{target}_1;$$

wherein $N_{off}$ represents the quantity of the transport blocks disabling HARQ feedback, $N_{ACK}$ represents a number of the transport blocks feeding back ACK, $N_{NACK}$ represents a number of transport blocks feeding back NACK, and $\text{target}_1$ represents the first threshold.

15. The apparatus according to claim 12, wherein the first HARQ process is in an enabled state responsive to that a proportion of the quantity of transport blocks enabling HARQ feedback in the plurality of transport blocks is greater than or equal to the second threshold.

16. The apparatus according to claim 12, wherein the first HARQ process is in an enabled state responsive to that a proportion of a number of transport blocks feeding back ACK in the plurality of transport blocks is greater than or equal to the third threshold.

17. The apparatus according to claim 16, wherein feedback information of the first HARQ process regarding the plurality of transport blocks is the ACK.

18. The apparatus according to claim 12, wherein the first HARQ process is in an enabled state responsive to that a number of the transport blocks feeding back ACK satisfies:

$$N_{ACK}/(N_{NACK}+N_{off}) \geq \text{target}_3;$$

wherein $N_{ACK}$ represents the number of the transport blocks feeding back ACK, $N_{NACK}$ represents a number of the transport blocks feeding back NACK, $N_{off}$ represents the quantity of the transport blocks disabling HARQ feedback, and $\text{target}_3$ represents the third threshold.

19. The apparatus according to claim 12, wherein the first information is determined based on a first operation responsive to that the quantity of the transport blocks disabling HARQ feedback in the plurality of transport blocks is equal to a number of the transport blocks enabling HARQ feedback.

20. A non-transitory computer-readable storage medium storing a program, wherein the program causes a computer to perform operations comprising:

receiving a plurality of transport blocks, wherein the plurality of transport blocks include at least one of transport blocks disabling hybrid automatic repeat request (HARQ) feedback or transport blocks enabling HARQ feedback;

determining to enable or disable a first HARQ process corresponding to the plurality of transport blocks based on first information, wherein the first information is determined based on the transport blocks enabling HARQ feedback in the plurality of transport blocks, and wherein the first information comprises at least a quantity of the transport blocks disabling HARQ feedback or a quantity of the transport blocks enabling HARQ feedback, and wherein the enabling or disabling of the first HARQ process is determined based on the first information and a first threshold or a second threshold; and enabling the first HARQ process or disabling the first HARQ process based on the determining, wherein at least one of the following is true:

the transport blocks enabling HARQ feedback include transport blocks feeding back ACK in the plurality of transport blocks, and wherein enabling or disabling of the first HARQ process is determined based on the first information and a third threshold; or the transport blocks enabling HARQ feedback include transport blocks feeding back NACK in the plurality of transport blocks, and wherein enabling or disabling of the first HARQ process is determined based on the first information and a fourth threshold.

* * * * *